US011150683B2

(12) United States Patent
Kitazawa (10) Patent No.: US 11,150,683 B2
(45) Date of Patent: Oct. 19, 2021

(54) RADIO-CONTROL TRANSMITTER

(71) Applicant: Futaba Corporation, Mobara (JP)

(72) Inventor: Hideo Kitazawa, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 17/014,652

(22) Filed: Sep. 8, 2020

(65) Prior Publication Data

US 2021/0072783 A1    Mar. 11, 2021

(30) Foreign Application Priority Data

Sep. 9, 2019 (JP) .............................. JP2019-163735

(51) Int. Cl.
| | | |
|---|---|---|
| G05G 1/01 | (2008.04) | |
| G05G 1/04 | (2006.01) | |
| H04B 1/02 | (2006.01) | |
| G05G 13/00 | (2006.01) | |
| A63H 30/04 | (2006.01) | |
| A63H 17/38 | (2006.01) | |

(52) U.S. Cl.
CPC .............. *G05G 1/01* (2013.01); *A63H 17/38* (2013.01); *A63H 30/04* (2013.01); *G05G 1/04* (2013.01); *G05G 13/00* (2013.01); *H04B 1/02* (2013.01); *G05G 2700/30* (2013.01)

(58) Field of Classification Search
CPC .......... A63H 30/04; A63H 17/38; G05G 1/01; G05G 1/04; G05G 13/00; G05G 2700/30; H04B 1/02; Y10T 74/20738; F41A 19/10; F41A 19/11; F41A 19/09; F41A 19/20; F41A 19/21
See application file for complete search history.

(56) References Cited

U.S. PATENT DOCUMENTS

| | | | | | |
|---|---|---|---|---|---|
| 1,785,794 | A | * | 12/1930 | Stiennon ................. | F41A 19/20 42/41 |
| 4,954,820 | A | * | 9/1990 | Kohno .................... | A63H 30/04 340/12.5 |
| 5,158,495 | A | * | 10/1992 | Yonezawa .............. | A63H 29/22 446/454 |
| 5,994,853 | A | * | 11/1999 | Ribbe .................... | A63H 30/04 318/16 |
| D481,080 | S | * | 10/2003 | Arai ............................. | D21/566 |
| 6,821,184 | B1 | * | 11/2004 | Yeung .................. | A63H 17/395 446/456 |
| D594,514 | S | * | 6/2009 | Noguchi ..................... | D21/566 |
| 9,836,954 | B2 | * | 12/2017 | Takayasu ............... | G08C 17/02 |
| D807,970 | S | * | 1/2018 | Kitazawa ..................... | D21/566 |
| 2005/0168373 | A1 | * | 8/2005 | Mukaida ................ | A63H 30/04 341/176 |

(Continued)

FOREIGN PATENT DOCUMENTS

| | | |
|---|---|---|
| CN | 107743411 A | 2/2018 |
| JP | 2015-213658 A | 8/2010 |

*Primary Examiner* — Daniel D Yabut
(74) *Attorney, Agent, or Firm* — Quarles & Brady LLP (57) ABSTRACT

A radio-control transmitter is provided which includes a trigger which has a throttle lever and a brake lever, wherein the throttle lever is capable of freely rocking with respect to a rotation shaft along an imaginary plane orthogonal to the rotation shaft and has a longitudinal direction parallel to the imaginary plane, and wherein the brake lever is integrated with the throttle lever and extends in a direction intersecting the imaginary plane.

3 Claims, 7 Drawing Sheets

(56) References Cited

U.S. PATENT DOCUMENTS

| | | | |
|---|---|---|---|
| 2006/0229034 A1* | 10/2006 | Gizis | A63H 30/04 455/95 |
| 2015/0370256 A1 | 12/2015 | Erhart | |
| 2016/0306353 A1* | 10/2016 | Kawamura | A63H 30/04 |
| 2016/0361639 A1 | 12/2016 | Schmitz | |
| 2017/0151494 A1 | 6/2017 | Ironmonger | |

* cited by examiner

RADIO-CONTROL TRANSMITTER

CROSS-REFERENCE TO RELATED APPLICATION

This application claims the priority benefit of Japanese Patent Application No. 2019-163735 filed Sep. 9, 2019, which is fully incorporated herein by reference.

BACKGROUND OF THE INVENTION

The present invention relates to a radio-control transmitter for remotely operating e.g. a variety of models (for example car, motorcycle, airplane, ship) and/or industrial machinery such as a crane, as a controlled object via wireless communication, more particularly a radio-control transmitter with a trigger for controlling a movement speed of the controlled object.

Background Art

Radio-control transmitters for remotely operating e.g. a variety of models (for example car, motorcycle, airplane, ship) and/or industrial machinery such as a crane, as a controlled object via wireless communication, are available which have various configurations depending on the type of the controlled object.

Such radio-control transmitters are roughly classified, in view of differences in their configurations, into a stick-type and a trigger-type. The stick-type of radio-control transmitters has two sticks arranged in a left-right direction on a front surface of a housing, the two sticks being configured to be operated in an up-down direction and the left-right direction, wherein such a type of radio-control transmitters is often used for operating a controlled object, such as a model car, airplane model, helicopter model, model ship, and industrial machinery. The trigger-type of radio-control transmitters has a trigger for operating a throttle of an engine or a motor and a wheel for steering control of the controlled object, wherein such a type of radio-control transmitters is often used mainly for operating a model car.

When an operator remotely operates the controlled object with the trigger-type of radio-control transmitter, the operator grips a grip section with one hand to support the whole radio-control transmitter, and simultaneously operates the trigger with an index finger of the one hand, while operating the wheel with the other hand.

In this manner, since in case of the trigger-type of radio-control transmitter the trigger is operated by putting an index finger of a hand gripping the grip section onto the trigger, it is necessary to change the trigger in order to adapt it to a hand size of the operator so that operation of the trigger is facilitated.

Therefore, as disclosed in Patent Document 1 listed below, the applicant of the present application proposed a radio-control transmitter which enables a trigger to be changed easily depending on a finger thickness of an operator.

The radio-control transmitter 1 is configured to transmit a control signal which corresponds to operation of a trigger 22 for controlling a movement speed of a controlled object. The trigger 22 has a gun-trigger shape subdivided into a throttle lever 22a and a brake lever 22b1 (22b2), wherein the throttle lever 22a is mounted pivotably on a housing, while the brake lever 22b1 (22b2) is screwed firmly to the throttle lever 22a in an exchangeable manner.

With the radio-control transmitter 1, replacement with a lever which is adapted to the finger thickness of the operator is possible simply by part exchange with removing and fastening a screw 33 to configure a trigger of a new size easily.

CITATION LIST

Patent Literature

Patent Document 1: JP 2015-213658 A

SUMMARY OF THE INVENTION

However, according to the invention relating a radio-control transmitter disclosed in Patent Document 1, a finger is subject to a large pressure during operating the brake lever by pressing it with the finger against a spring force for return, wherein pain may occur by repeatedly operating the brake, especially at a boundary portion between a nail and a skin of the finger in case that the brake lever comes into contact with this portion.

Therefore, the present invention is based on the above-mentioned problem and is aimed at providing a radio-control transmitter with a brake lever which causes a reduced load on a finger by operation of the brake lever, so that pains cannot easily occur at the finger even when repeatedly operating the brake lever, which allows the brake lever to be more easily operated than conventionally.

Claim 1 defines a radio-control transmitter which is configured to transmit a control signal to a controlled object, the control signal being generated by operating an operation element, wherein the operation element includes: a first lever which is capable of freely rocking with respect to a rotation shaft along an imaginary plane orthogonal to the rotation shaft, wherein the first lever extends along the imaginary plane; and a second lever which is integrated with the first lever, wherein the second lever extends in a direction intersecting the imaginary plane.

Claim 2 defines the radio-control transmitter according to claim 1, wherein the first lever is mounted pivotably on the rotation shaft, and wherein the second lever is fixed to the first lever in an exchangeable manner.

Claim 3 defines the radio-control transmitter according to claim 2, including an adjustment element for adjusting a rotation range for the second lever.

Should the radio-control transmitter according to claim 1 be operated, an operator operates an operation element by gripping the radio-control transmitter with one hand, putting a finger of this hand onto the operation element and moving this finger forwards and backwards. For example, it is possible to rotate the first lever toward the operator in the imaginary plane by operation via moving the finger toward the operator, wherein the second lever can be rotated in a direction opposite to the operator by operation via moving the finger forwards. Here, since the second lever extends in the direction intersecting the imaginary plane, a contact area between the finger and the second lever is larger than when a longitudinal direction of the second lever is arranged in the imaginary plane and in parallel thereto similarly to the first lever, whereby less pressure is applied to the finger by the second lever. This results in less load on the finger by operation of the second lever even if the second lever is repeatedly pressed out by the finger, wherein pains cannot easily occur on the finger even when repeating operations, which facilitates the operation more than conventionally.

With the radio-control transmitter according to claim 2, the second lever which is tilted in the direction intersecting the imaginary plane can be attached to and removed from the first lever. As the second lever, two types of structures are conceivable which have opposed tilt directions related to the imaginary plane, i.e., one type of structure which intersects the imaginary plane and has a tip extending on a right side of the imaginary plane, and another type of structure which intersects the imaginary plane and has a tip extending on a left side of the imaginary plane. Thus, according to such an invention, one of the two types of second levers as described above can be attached to the first lever depending on the user's dominant hand to adapt and optimize the radio-control transmitter to the user's dominant hand.

With the radio-control transmitter according to claim 3, it is possible to adjust the rotation range for the second lever in an arbitrary manner.

DETAILED DESCRIPTION OF THE PREFERRED EMBODIMENTS

Hereinafter, embodiments of the present invention will be described in details with reference to the drawings. A radio-control transmitter according to the present invention (hereinafter referred to as "transmitter") is configured to remotely operate e.g. a variety of models (for example car, motorcycle, airplane, ship) and/or industrial machinery such as a crane, as a controlled object, by utilizing a predetermined frequency band (e.g. 2.4 GHz band), determining a transmission frequency through frequency hopping, and transmitting a control signal (radio wave) to the controlled object, wherein the control signal corresponds to operation of an operation element arranged on a housing, e.g. a trigger and/or a stick, wherein according to the frequency hopping an empty band is selected automatically out of the frequency band.

In description of the following example, reference is made by way of example to a model car as the controlled object which is remotely operated via the transmitter. Further, in the following description, it is assumed that an engine is used as a power source for the controlled object. However, a motor may be also used as the power source.

[1. Configuration of the Transmitter]

Figure 1:
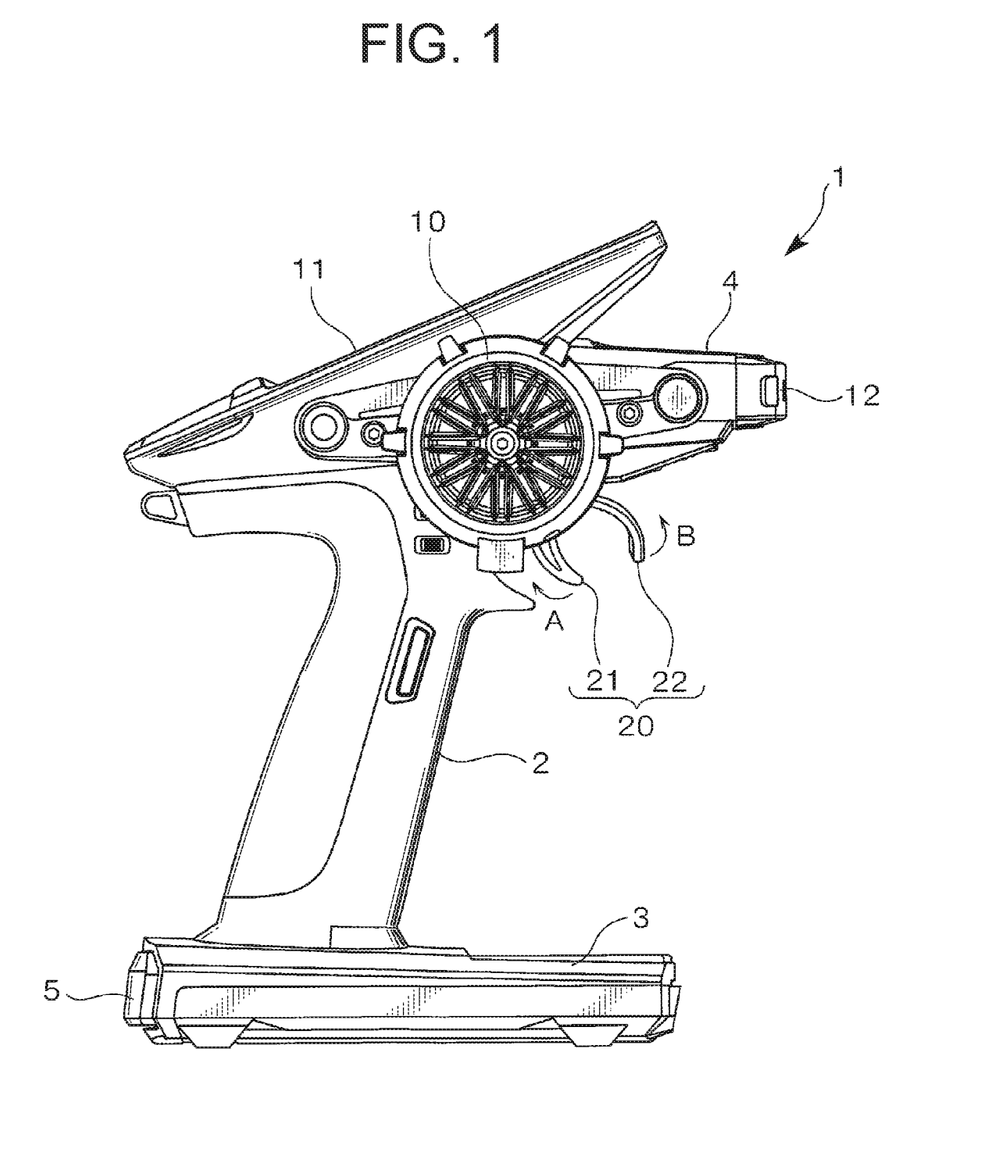
FIG. 1. shows a front view illustrating a whole configuration of a radio-control transmitter according to an embodiment of the present invention.
Figure 2:
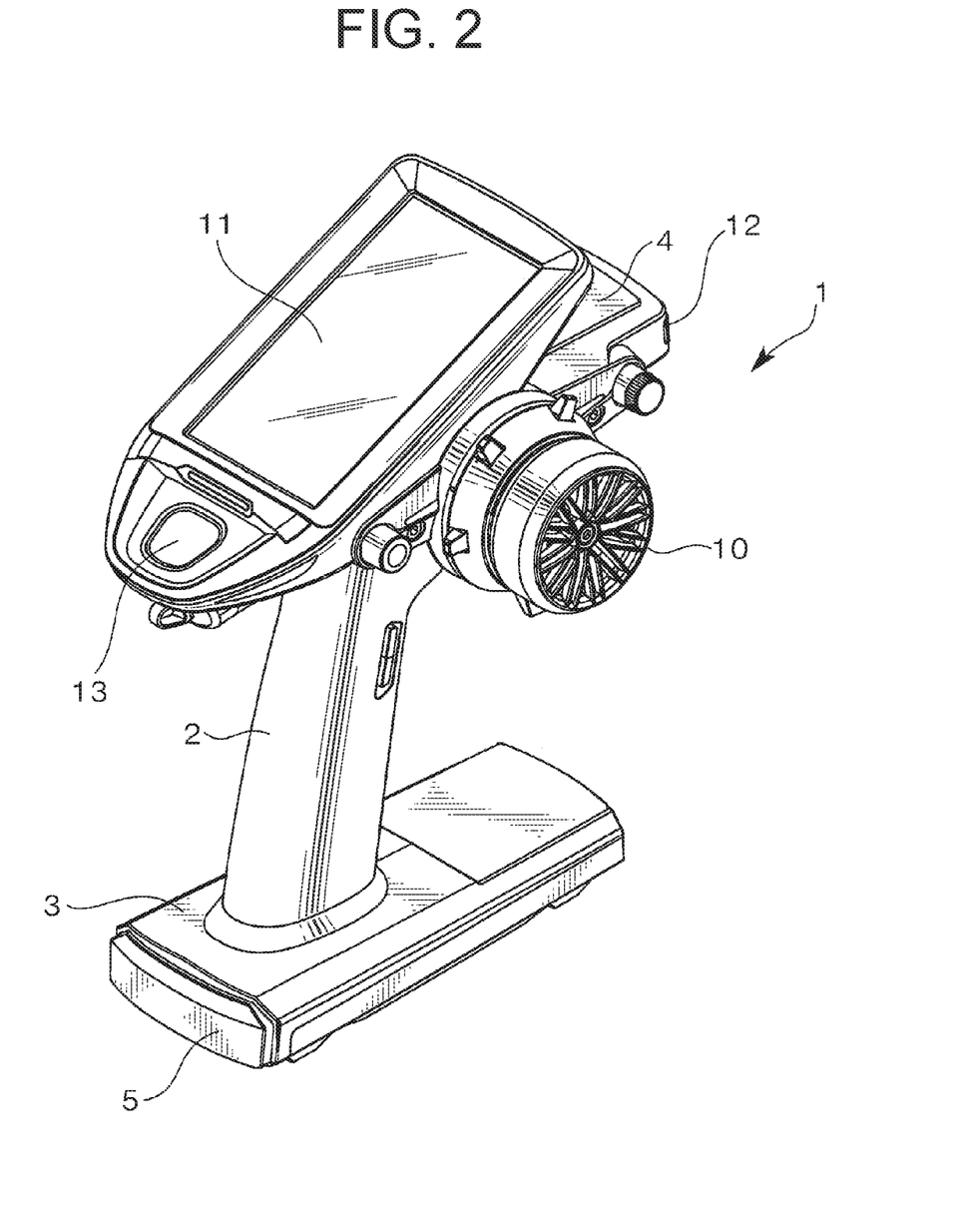
FIG. 2. shows a perspective view illustrating a whole configuration of a radio-control transmitter according to the embodiment of the present invention.

The transmitter 1 is substantially constituted with a grip section 2, a base section 3 and a head section 4, as shown in FIGS. 1 and 2, wherein respective housings of these sections are formed with thermoplastic resin having flexibility (e.g. general-purpose plastics).

<1-1. Grip Section>

The grip section 2 has an end (lower end) integrated with the base section 3 and another end (upper end) integrated with the head section 4, wherein an outer shape of the grip section 2 is configured so that it has an elliptic horizontal cross section and is formed in a column shape which is gradually reduced in thickness from the base section 3 side toward the head section 4 side. The grip section 2 serves as a handle section which is gripped by an operator for remotely operating the controlled object.

<1-2. Base Section>

The base section 3 is a rectangular part arranged at an end (lower end) of the grip section 2. The base section 3 serves for preventing a hand gripping the grip section 2 from slipping out of it by restricting a lower limit position for the hand, and also as a leg section having a bottom surface with a predetermined area for placing the transmitter 1 when being not used, e.g. for putting it on ground in a vertical orientation.

Further, the base section 3 is provided with a switch mechanism 5 which is configured to be operated when a wheel 10 and/or a trigger 20 is operated by the operator with his both hands. FIG. 2 shows an example where this switch mechanism 5 is arranged at an end of the base section 3 facing the operator when the grip section 2 is gripped by the operator. With the switch mechanism 5, a function (or functions) assigned to the switch mechanism 5 can be activated by bring the transmitter 1 by the operator, who is performing the operation with his both hands, closer to his body part other than fingers of both hands (e.g. breast, belly, shoulders, crotch and/or knees) and/or an object in the vicinity (e.g. a handle at a stadium) and switching on/off contacts of the switch mechanism 5.

Any function may be assigned to the switch mechanism 5, e.g. switching on/off a turbo function, mixing, gyro operation, lap time measurement, sudden braking, camera. However, if particularly a function which is desired by the operator to be operated in parallel during operation with both hands is assigned to the switch mechanism 5, it is possible to operate the switch mechanism 5 in a moment by quick decision in case of emergency, wherein the function assigned to the switch mechanism 5 can be switched on/off immediately.

<1-3. Head Section>

The head section 4 is arranged at the other end (upper end) of the grip section 2, and includes a wheel 10 as a first operation element and a trigger 20 as a second operation element which is essential for the present invention.

As shown in FIGS. 1 and 2, the wheel 10 is a substantially circle-disc-shaped element for steering which is provided for controlling a travelling direction of the controlled object.

A revolution shaft (not shown) is provided at the head section 4 of the transmitter 1, wherein the revolution shaft extends vertically to a plane of the substantially circle disc shape of the wheel 10 and the wheel 10 is attached to the revolution shaft so that a center axis of the wheel 10 coincides with the revolution shaft. The travelling direction of the controlled object may be controlled by rotating the wheel 10 clockwise and/or counterclockwise from a predetermined reference position.

Figure 3:
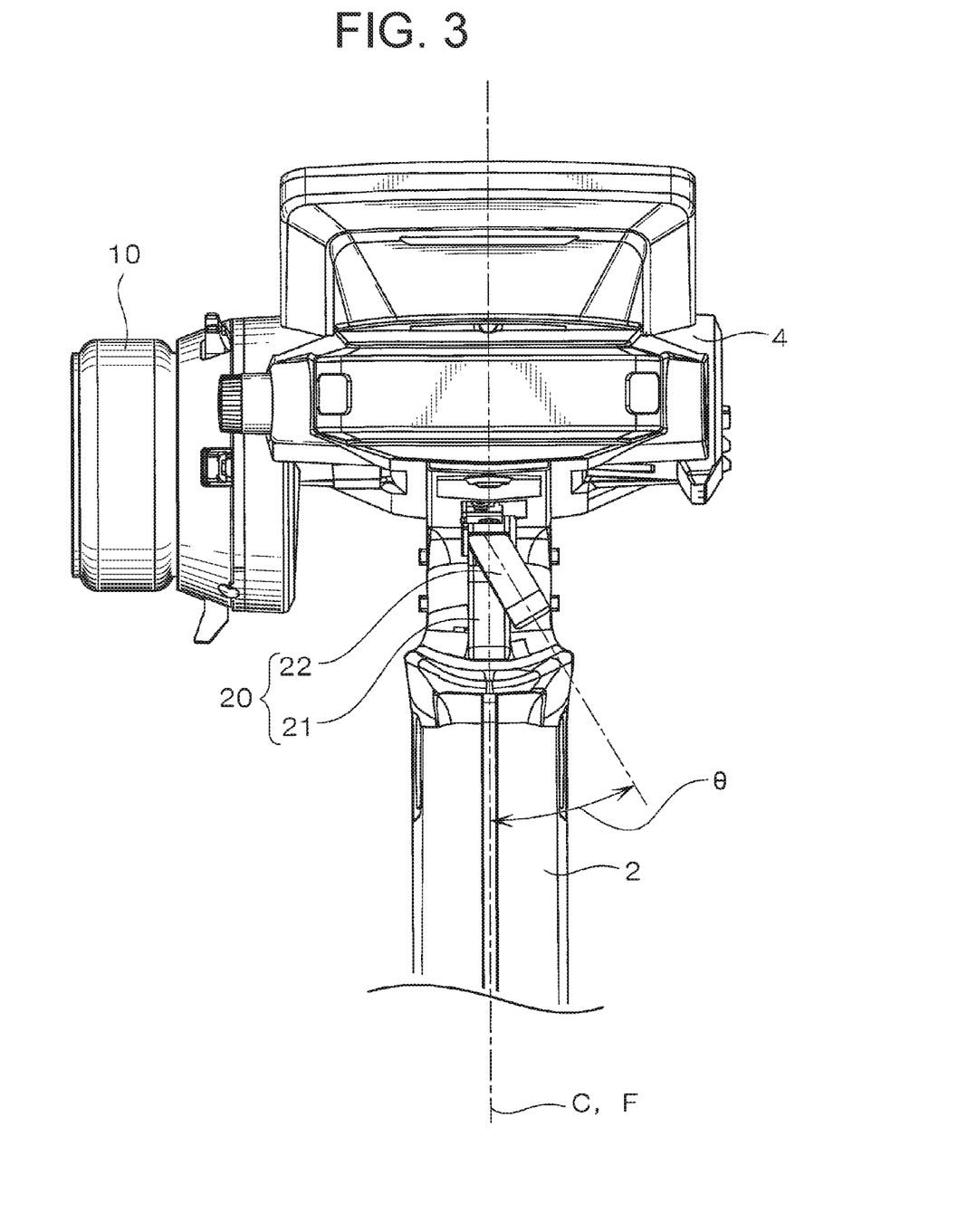
FIG. 3. shows a right side view particularly illustrating a shape of a trigger as an operation element in the radio-control transmitter according to the embodiment of the present invention.
Figure 4:
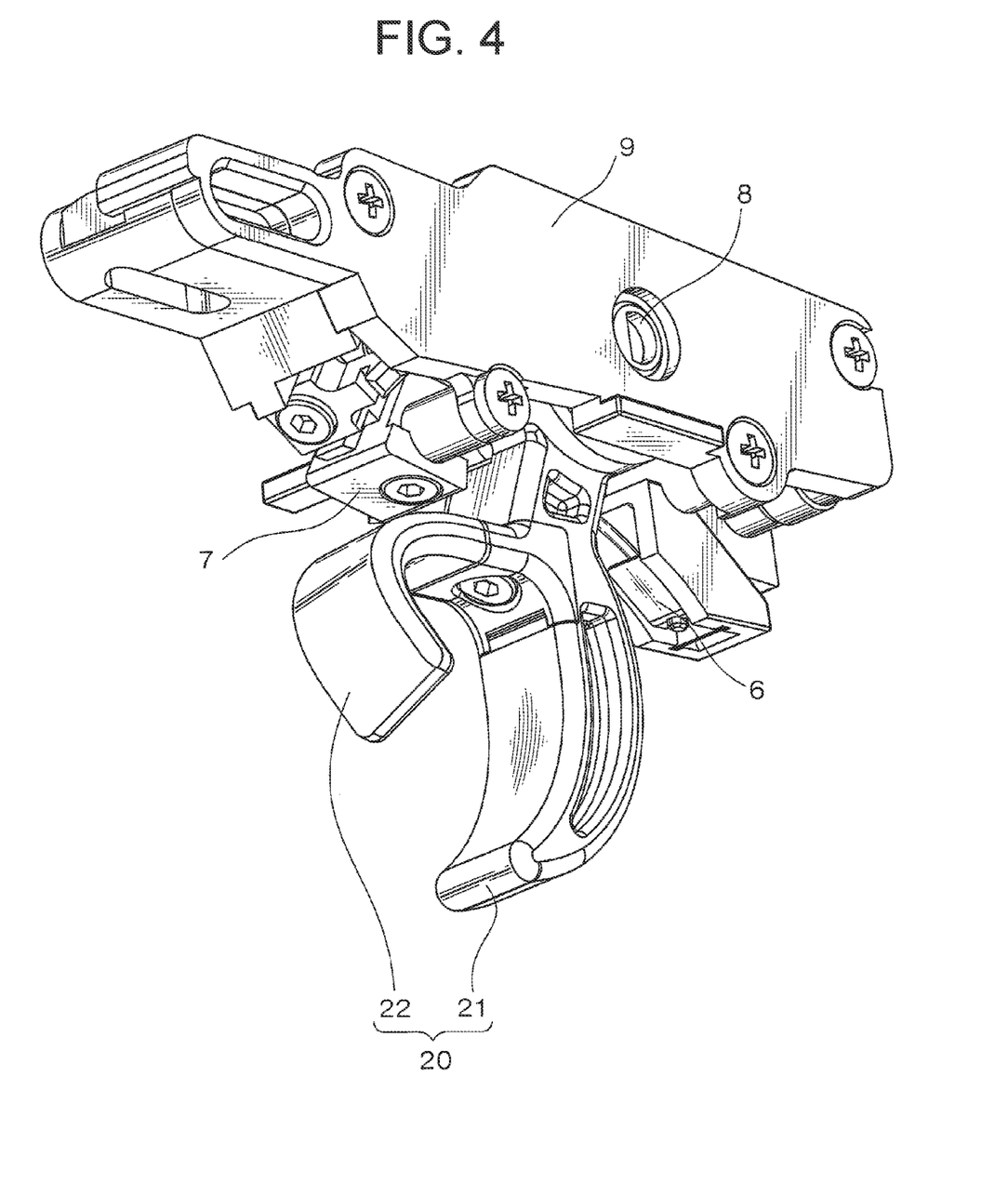
FIG. 4. shows a perspective view of a trigger unit for a right-handed user which is a component of the radio-control transmitter according to the embodiment of the present invention.
Figure 5:
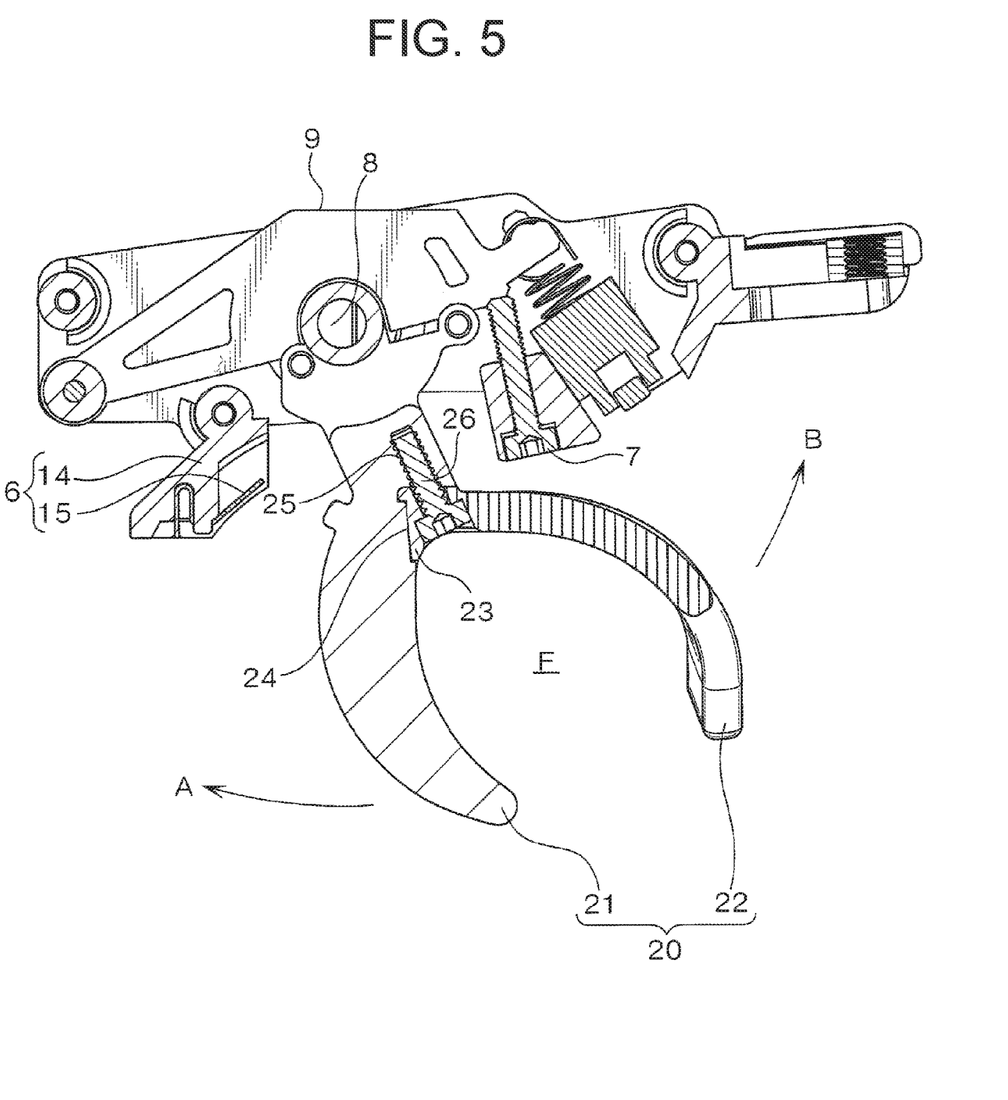
FIG. 5. shows a sectional view of a trigger unit for a right-handed user which is a component of the radio-control transmitter according to the embodiment of the present invention.

As shown in FIGS. 1 and 3 to 5, the trigger 20 is an operation element for controlling a power source for the controlled object and controlling a movement speed of the controlled object. The trigger 20 generally has a gun-trigger shape which is substantially C-shaped, wherein the trigger 20 is configured by integrating a throttle lever 21 as a first lever with a brake lever 22 as a second lever which are separate components, and is attached to the head section 4 so that the trigger 20 is capable of being rotated in directions A and B as shown in FIG. 5.

FIG. 5 shows a trigger unit 9 with the trigger 20 attached via the rotation shaft 8 in a freely rotatable manner. By integrating the trigger unit 9 into the head section 4 on its lower side, the trigger 20 protrudes from the head section 4 on its lower side. In this manner, the trigger 20 may be operable by a finger of the operator gripping the grip section 2. It is to be noted that FIG. 5 shows an initial position of the trigger 20 (the throttle lever 21 and the brake lever 22).

As shown in FIG. 5, the trigger 20 is provided so as to be rotatable in the direction A according to FIG. 4 until the throttle lever 21 comes into contact with a stopper 6 at the trigger unit 9 which forms a part of the head section 4. The stopper 6 is a component which is configured with a base body 14 and a leaf spring 15 attached to the base body 14, the base body 14 being mounted to the trigger unit 9 in a freely rotatable manner, wherein a rotation range for the throttle lever 21 can be adjusted by rotating the base body 14 and thereby adjusting its position. This means that the stopper 6 is an adjustment element for adjusting the rotation range for the throttle lever 21. Additionally, the trigger 20 is provided so as to be rotatable in the direction B until the brake lever 22 comes into contact with a stopper 7 at the trigger unit 9 which forms a part of the head section 4. The stopper 7 is a screw which is screwed into the trigger unit 9 in a freely rotatable manner, wherein an amount of external protrusion of the stopper 7 can be adjusted by varying a screwing depth of the stopper 7 into the trigger unit 9, wherein the rotation range for the brake lever 22 can be thus adjusted. This means that the stopper 7 is an adjustment element for adjusting the rotation range for the brake lever 22.

A recess 24 is formed in the throttle lever 21, wherein a base end 23 of the brake lever 22 is fitted into the recess 24. Further, a threaded hole 25 is formed in the throttle lever 21, wherein the threaded hole 25 is connected to the recess 24. A screw 26 is screwed into the threaded hole 25, wherein the screw 26 serves for fixing the brake lever 22 to the throttle lever 21 in a state where the base end 23 of the brake lever 22 is fitted into the recess 24. Thus, the brake lever 22 is fixed by screwing to the throttle lever 21 with rigidity.

Referring to FIGS. 1 and 3 to 5, the throttle lever 21 and the brake lever 22 according to the embodiment will be described with regard to their shapes. In FIG. 5, an imaginary plane F is assumed which is orthogonal to the rotation shaft 8 for the throttle lever 21 and the brake lever 22 and coincides with the drawing plane of FIG. 5. According to FIG. 4, the imaginary plane F is formed by a plane which is orthogonal to the rotation shaft 8 and includes a centerline extending in parallel to a longitudinal direction of the trigger unit 9, however, the imaginary plane F is not shown in FIG. 4. According to FIG. 3, the imaginary plane F is formed by a plane which extends along a center axis C for the grip section 2 and the head section 4 and vertically to the drawing plane.

As shown in FIGS. 3 to 5, the throttle lever 21 has a curved shape which is convex toward the operator or downwards, wherein the whole of the throttle lever 21 from the base end to a tip end extends along the imaginary plane F, and thus, extends in an extending direction parallel to the imaginary plane F. In contrary thereto, the brake lever 22 has a curved shape which is convex upwards, wherein its base end extends generally along the imaginary plane. However, a tip end of the brake lever 22 protrudes out of the imaginary plane F, and thus, extends in an extending direction which intersects the imaginary plane F.

When viewing the above-described shapes of the throttle lever 21 and the brake lever 22 in the Figures, the throttle lever 21 according to FIG. 3 is shown as being substantially in parallel to the centerline C in the imaginary plane F, while the tip end of the brake lever 22 protrudes out of the imaginary plane F including the centerline C to the right side in the Figure, wherein a centerline of the brake lever 22 is tilted with a tilt angle θ of around 30 degree relative to the imaginary plane F including the centerline C. Further, according to FIG. 4, it can be seen that the throttle lever 21 is rotatable around the rotation shaft 8 and along the imaginary plane F, and that the brake lever 22 is bent toward the front of the drawing plane so that its tip end protrudes toward the front of the drawing plane outside the imaginary plane F. Additionally, as shown in a sectional view of FIG. 5, the entire throttle lever 21 is shown in cross section within the imaginary plane F which substantially coincides with the drawing plane of the FIG. 5, while the tip end of the brake lever 22 which is located outside the imaginary plane F is not shown in cross section.

The brake lever 22 of the trigger 20 according to the present embodiment is a component which is exchangeable depending on a dominant hand of the operator. FIGS. 1 and 3 to 5 show an example with a brake lever 22 attached which is provided for a right-handed user. According to FIGS. 1 to 3, the operator grips the grip section 2 with his left hand and operates the trigger 20 with a finger of the left hand in order to operate the wheel 10 with his right hand, i.e. dominant hand, wherein the wheel 10 requires fine operation. The trigger 20 is usually operated with an index finger, wherein an engine output is adjusted by pulling the throttle lever 21 in the direction of arrow A (see FIG. 5) with the index finger put on the throttle lever 21, while the brake is applied by pushing the brake lever 22 in the direction of arrow B with a back of the index finger.

The trigger 20 is further configured so that when the finger put on the throttle lever 21 is released, the trigger 20 automatically returns to a predetermined initial position (a state shown in FIG. 5). This initial position is referred to as "neutral position". At the neutral position, an engine of the controlled object is rotated, however, a clutch of the controlled object is disengaged so that the controlled object is in a non-travelling state. It is to be noted that in case of a motor as the power source for the controlled object, the motor is not rotated at the neutral position.

Throttle control of the engine of the controlled object is performed by pulling the throttle lever 21 of the trigger 20 in the direction of arrow A according to FIGS. 1 and/or 5 to control a movement speed of the controlled object. The controlled object is more accelerated by operating the throttle lever 21 of the trigger 20 with a larger amount in the direction of arrow A.

Further, it may be configured so that brake control is performed by operating the brake lever 22 of the trigger 20 in the direction of arrow B according to FIGS. 1 and/or 5.

Then, the brake is applied with a stronger force by operating the brake lever 22 of the trigger 20 with a larger amount in the direction of arrow B.

It is to be noted that depending on the transmitter configuration, some transmitters 1 may move a controlled object backwards by operating a brake lever 22 of a trigger 20 in the direction of arrow B according to FIGS. 1 and/or 5. Further, in case of using a motor for motive power of the controlled object, the controlled object may be accelerated by operating the throttle lever 21 of the trigger 20 in the direction of arrow A according to FIGS. 1 and/or 5.

According to the present embodiment, with regard to the brake lever 22, at least its extending direction on the tip end side is tilted to the extending direction of the throttle lever 21, and the brake lever 22 extends in a direction intersecting the imaginary plane F, as noted above. Therefore, in case of the shown embodiment, a contact area between the finger and the brake lever 22 is larger so that the finger is subject to less pressure by the brake lever 22, as compared with a case where the extending direction of the brake lever 22 would be arranged within the imaginary plane F similarly to that of the throttle lever 21 and the brake lever 22 would be thus arranged within the imaginary plane F. Thus, even if the brake lever 22 is repeatedly pushed out by a finger in control of the controlled object as described above, the finger is subject to less load due to operation of the brake lever 22, pains cannot easily occur on the finger even when repeating operation, which facilitates the operation more than conventionally.

Preferably, the tilt angle θ of the tip end of the brake lever 22 to the imaginary plane F (see FIG. 3), a ratio of a length of the tip end having the tilt angle θ relative to the overall length, and a relation between these elements and the overall curvature etc. are determined comprehensively also under consideration of a finger length and/or thickness of the operator, wherein several components which can achieve the best usability are prepared so that it is possible to select one of them. A buffer such as sponge and/or foam may be provided on a surface of the brake lever 22 which comes into contact with a finger, in order to protect the finger.

Figure 6:
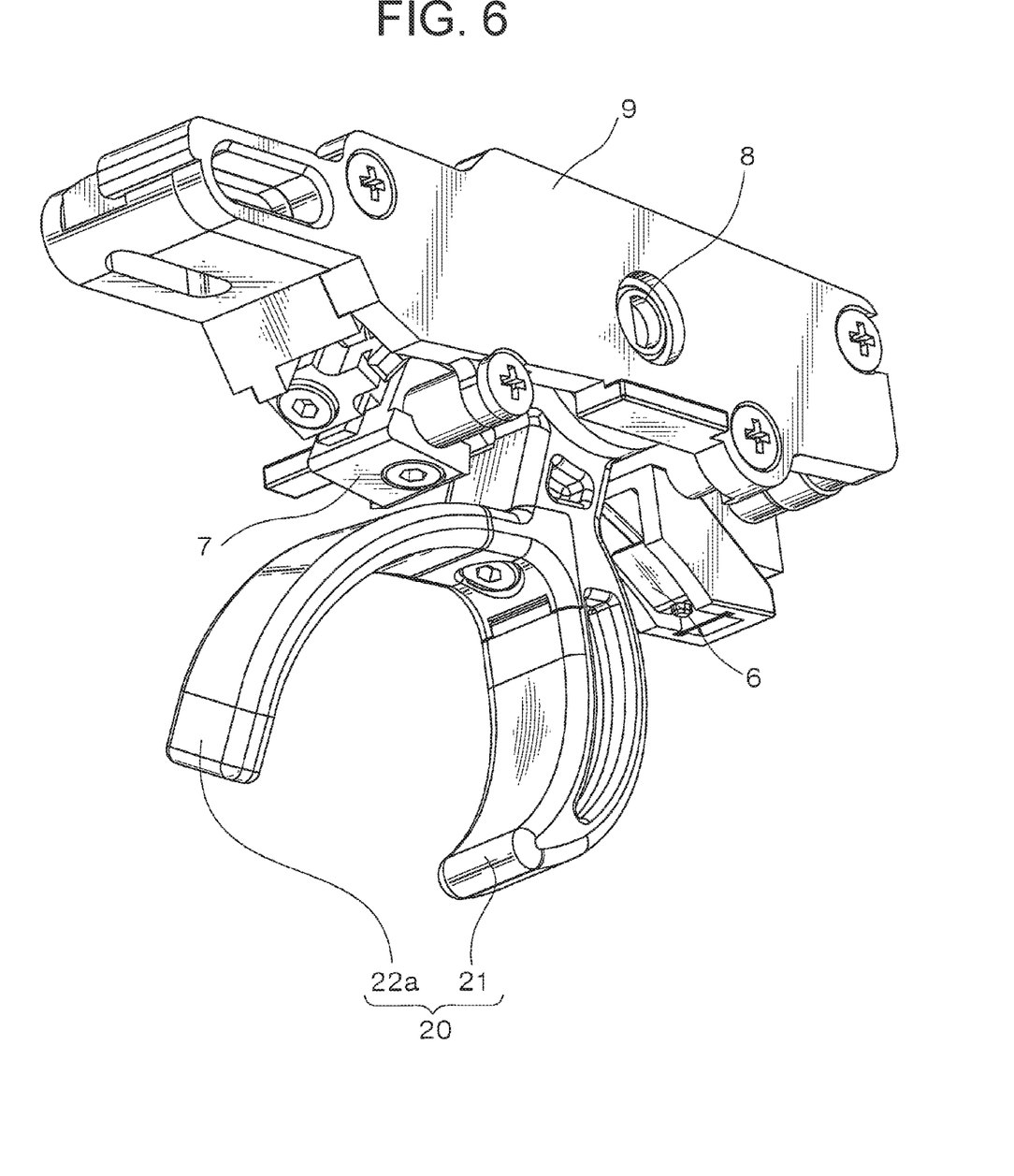
FIG. 6. shows a perspective view of a trigger unit for a left-handed user which is a component of the radio-control transmitter according to the embodiment of the present invention.

FIG. 6 shows an example for the radio-control transmitter 1 according to the present embodiment with a brake lever 22a attached which is provided for a left-handed user. In contrary to the example according to FIG. 4, the brake lever 22a according to FIG. 6 is bent backwards with respect to the drawing plane, wherein it can be seen that its tip end protrudes out of an imaginary plane F backwards with respect to the drawing plane. The transmitter for a left-handed user differs from the transmitter 1 for a right-handed user according to FIGS. 1 and 2, not only in the shape of the brake lever 22a, but also in a position of a wheel 10. Although not shown, the transmitter for a left-handed user has a structure in which the wheel 10 is arranged on a side of the head section 4 which is opposite to that according to FIGS. 1 and 2. Then, the operator grips the grip section 2 with his right hand and operates the trigger 20 with a finger of the right hand in order to operate the wheel 10 with his left hand, i.e. dominant hand, wherein the wheel 10 requires fine operation. The trigger 20 is usually operated with an index finger, wherein the engine output is adjusted by pulling the throttle lever 21 toward the operator with the index finger put on the throttle lever 21, while the brake is applied by pushing the brake lever 22a with a back of the index finger.

In addition to the wheel 10 and the trigger 20, the head section 4 of the transmitter 1 is further with a plurality of operation elements, such as buttons. It is possible to assign special operations to these operation elements, the special operations being related to operation of the controlled object.

As shown in FIGS. 1 and 2, the head section 4 includes a display section 11 and an antenna 12. The display section 11 is tilted with a predetermined angle so that it is more easily visible to the operator when the operator grips the grip section 2. The display section 11 is a display for displaying settings of the transmitter 1, wherein it is possible to switch the displayed contents and/or change the settings of the transmitter 1 by operating setting operation elements 13 arranged around the display section 11, such as a jog switch and/or other operation buttons and/or slide switches.

The antenna 12 is mounted pivotably on one end portion of the head section 4 which is opposite to the display section 11 when the grip section 2 is gripped by the operator (i.e. an end of the head section 4 which is opposite to an end of the head section 4 facing the operator in a state where the grip section 2 is gripped by the operator). When remotely controlling the controlled object, the antenna 12 is used in an erected state (not shown) with vertical orientation, being rotated by 90° from a horizontal state (indicated by a solid line in FIG. 2) in which it forms an integral outer contour together with the head section 4. By using the antenna 12 in the erected state, it can increase directivity for remote control of the controlled object.

<1-4. Electrical Configuration>

Figure 7:
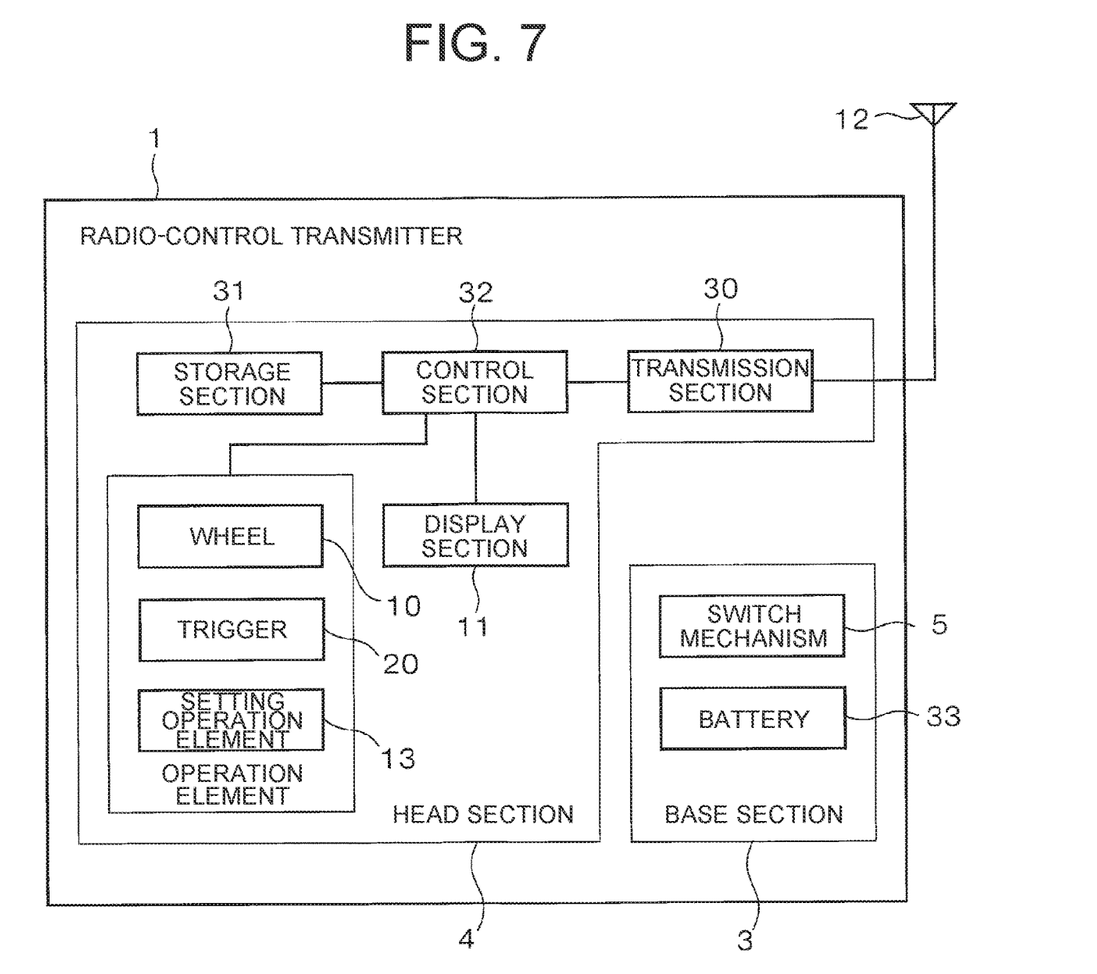
FIG. 7. shows a block configuration diagram of a radio-control transmitter according to the present invention.

Further, the head section 4 is provided with an internal electrical circuitry section which includes the above-described display section 11, a transmission section 30, a storage section 31 and a control section 32, as shown in FIG. 7.

Here, the base section 3 is provided with a battery 33 in an exchangeable manner, the battery 33 being intended to supply various sections of the electrical circuitry section (the display section 11, transmission section 30, storage section 31 and control section 32) with necessary driving power.

The transmission section 30 is configured to modulate and amplify transmission data generated by the control section 32 and to transmit the modulated and amplified control signal to the controlled object via the antenna 12 under control of the control section 32.

The storage section 31 is configured to store various setting informations based on operation of the setting operation elements 13, such as a jog switch, under control of the control section 32. Further, the storage section 31 includes a control program stored therein, which is configured to perform driving control of various sections constituting the transmitter 1.

The control section 32 is configured to comprehensively control the display section 11, the transmission section 30 and the storage section 31, wherein the control section 32 generates the transmission data corresponding to operation and/or setting of the wheel 10 and/or trigger 20, control display of the display section 11, control output of the control signal from the transmission section 30 via the antenna 12, storage setting information into the storage section 31, and perform driving control of various sections of the transmitter 1 based on the control program stored in the storage section 31, and so on.

<1-5. Effect and Advantage of the Transmitter>

According to the transmitter 1 as described above, an operator grips the grip section 2 with one hand, puts an index finger of the hand gripping the grip section 2, on the trigger 20 and operates the trigger 20 with this index finger, while the operator operates the wheel 10 with the other hand, the other hand being holding the wheel 10. Then, the control signal corresponding to operation of the trigger 20 and the wheel 10 is transmitted to the controlled object to remotely control the controlled object.

Further, with the transmitter 1 according to the above embodiment, it is possible to freely select a brake lever 22 for a right-handed or left-handed user, or even select one of brake levers 22 for a right-handed user which has a desired shape and/or dimensions, or one of brake levers for a left-handed user which has a desired shape and/or dimensions, and thus to easily conduct replacement with it, simply by removing the screw 26, which enables replacement with the brake lever 22 which is adapted to a dominant hand and its finger thickness of the operator.

<1-6. Further Embodiment for the Transmitter>

With reference to the above-described embodiment, the configuration has been described in which the throttle lever 21 is fixed to the head section 4 in a freely rotatable manner in the initial state, wherein the brake lever 22 is screwed firmly to the throttle lever 21. However, it may be also configured with a relation between the throttle lever 21 and the brake lever 22 being inversed. This means that the brake lever 22 may be fixed to the head section 4 in a freely rotatable manner in the initial state, wherein the throttle lever 21 may be screwed firmly to the brake lever 22. It is obvious that also according to such a further embodiment, the throttle lever 21 extends along the imaginary plane similarly to the above-described embodiment, wherein the brake lever 22 extends in the direction intersecting the imaginary plane.

Although embodiments of the transmitter according to the present invention have been described above, the present invention should not be limited by description and drawings with reference to the embodiments. Namely, it should be understood that all of further embodiments, examples and implementation techniques which can be achieved by those skilled in the art or the like based on the above embodiments are included in the scope of the present invention.

REFERENCE SIGNS LIST

1 Radio-control transmitter (Transmitter)
2 Grip section
3 Base section
4 Head section
6 Stopper as an adjustment element for the throttle lever
7 Stopper as an adjustment element for the brake lever
8 Rotation shaft for the trigger
10 Wheel as an operation element
20 Trigger as an operation element
21 Throttle lever as a first lever
22 Brake lever as a second lever
F Imaginary plane

What is claimed is:

1. Radio-control transmitter for transmitting a control signal to a controlled object, comprising:
    an operation element configured so that the control signal is generated by operating the operation element,
    the operation element comprising:
    a first lever which is capable of freely rocking with respect to a rotation shaft along an imaginary plane orthogonal to the rotation shaft, wherein the whole of the first lever extends along the imaginary plane; and
    a second lever which is integrated with the first lever, wherein the second lever extends in a direction intersecting the imaginary plane, wherein a tip end of the second lever protrudes out of the imaginary plane.

2. The radio-control transmitter according to claim 1, wherein the first lever is mounted pivotably on the rotation shaft, and
    wherein the second lever is fixed to the first lever in an exchangeable manner.

3. The radio-control transmitter according to claim 2, comprising:
    an adjustment element for adjusting a rotation range for the second lever.

\* \* \* \* \*